United States Patent
Ashtiani et al.

(10) Patent No.: US 6,849,016 B2
(45) Date of Patent: Feb. 1, 2005

(54) OVER-MOLDED BEADED CABLE FOR DRIVING APPLICATIONS

(75) Inventors: Mansour Ashtiani, Beverly Hills, MI (US); Xinhua (Sam) He, Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 73 days.

(21) Appl. No.: 10/153,016

(22) Filed: May 21, 2002

(65) Prior Publication Data

US 2003/0069099 A1 Apr. 10, 2003

Related U.S. Application Data

(60) Provisional application No. 60/327,447, filed on Oct. 5, 2001.

(51) Int. Cl.[7] .............................. F16G 1/22; F16G 1/28; F16G 13/08
(52) U.S. Cl. ..................... 474/203; 474/154; 474/256; 59/78.1
(58) Field of Search ................................ 474/203, 254, 474/256, 255, 252, 258; 72/466, 478; 59/78, 78.1, 95, 2; 29/460, 527.3

(56) References Cited

U.S. PATENT DOCUMENTS

| | | | | |
|---|---|---|---|---|
| 538,222 A | * | 4/1895 | Davids | 474/203 |
| 3,091,030 A | * | 5/1963 | Zumbrunnen | 474/203 |
| 3,494,214 A | * | 2/1970 | Egli | 474/203 |
| 3,777,586 A | * | 12/1973 | Stirton | 474/256 |
| 4,031,766 A | * | 6/1977 | Beck | 474/254 |
| 4,214,488 A | * | 7/1980 | Conrad | 474/154 |
| 4,795,410 A | * | 1/1989 | Alderfer | 474/256 |
| 5,836,199 A | * | 11/1998 | Loud | 59/78.1 |
| 6,167,867 B1 | | 1/2001 | Garrick | |

* cited by examiner

Primary Examiner—Marcus Charles
(74) Attorney, Agent, or Firm—Scott A. McBain

(57) ABSTRACT

An over-molded beaded driving cable which has an inner core, a plurality of inner core structures. An outer jacket may encompass the inner core and inner core structures. Each of a plurality of outer beads concentrically surrounds an inner core structure. The outer beads are over-molded in this position, forming an interlocking inner core structure and outer bead configuration capable of high load and high flexible performance. An end fitting placed at each end portion of the inner core provides for a driving cable assembly with a variety of end fitting configurations, including a closed loop connection, for automotive and non-automotive applications.

21 Claims, 3 Drawing Sheets

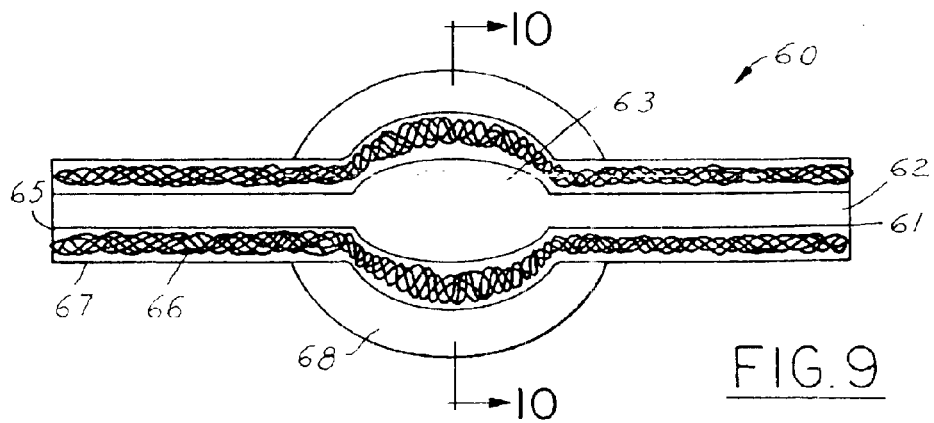
FIG. 9
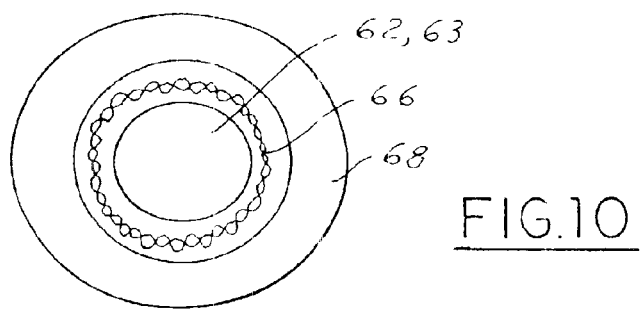
FIG. 10
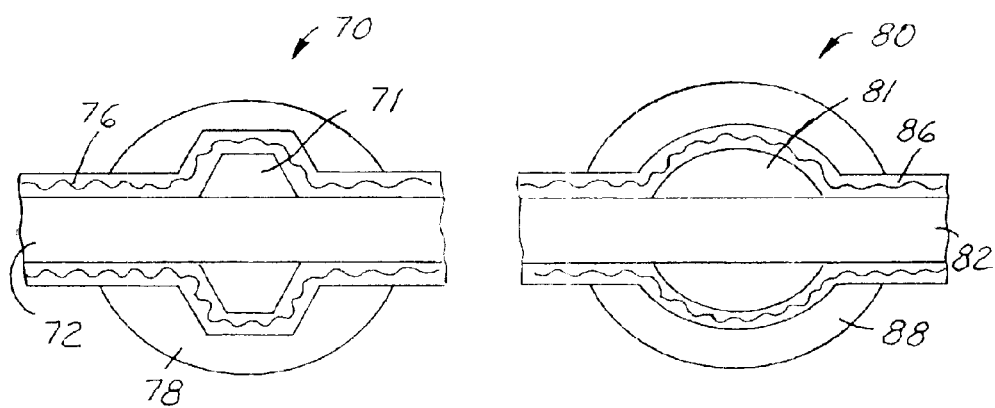
FIG. 11
FIG. 12

OVER-MOLDED BEADED CABLE FOR DRIVING APPLICATIONS

CROSS REFERENCE TO RELATED APPLICATION

The present invention claims priority from U.S. Provisional Application Ser. No. 60/327,447 filed on Oct. 5, 2001 entitled "Construction, Processing and Applications of Over-molded Beaded Cables."

FIELD OF INVENTION

The present invention relates generally to driving cables and more specifically to over-molded beaded driving cables.

BACKGROUND OF THE INVENTION

Beaded driving cables are often used in products that require connection of two or more devices for automotive and non-automotive systems. Typical beaded driving cables consist of a beaded core and end fittings. The end fittings are located at either end of the cables and provide connection points for other devices. The inner core of these cables may be coated with an outer jacket, or, alternatively, may be uncoated. It is desirable to increase the pulling strength of the beads for high load applications, such as pulling a door or a lift gate. In automotive systems, a beaded driving cable may be used in a variety of applications, including sliding doors, lift gates, hood and trunk openers, and windows and latches. Thus, there exists a need for a beaded driving cable with increased pulling strength.

Further, in automotive and non-automotive systems, beaded driving cables may create vibrations and noise when in use. It is also desirable to increase the flexibility for applications of smaller bending radius. Thus, there exists a need for a beaded driving cable with increased flexibility and strength that can provide a wide range of automotive and non-automotive applications while improving noise and vibrations.

SUMMARY OF THE INVENTION

Accordingly, it is an object of the present invention to provide an improved beaded driving cable.

It is a further object of the present invention to provide an over-molded beaded driving cable with increased strength and flexibility, which is capable of high load performance and suitable for applications of smaller bending radius.

It is another object of the present invention to provide a method of making an over-molded beaded driving cables for use in automotive and non-automotive driving systems.

It is an additional object of the present invention to provide an improved driving system that uses a lightweight over-molded beaded driving cable to reduce noise and vibration while increasing the strength and flexibility of the driving system.

In accordance with the above and other objects of the present invention, an over-molded beaded cable is provided.

The over-molded beaded cable has an inner cable member with a plurality of inner bead members protruding from an exterior surface of the inner cable member. The inner bead members may be an integral component of the inner cable member and positioned at regular intervals with respect to each other. Alternatively, the inner bead members may be imbedded within the inner core filaments, or placed around the inner cable member in a secure fashion. The inner cable member and the inner bead members may have an outer jacket therearound. Each inner core structure is encapsulated within the outer jacket and an outer bead member. In this position, the inner core structure and the outer bead member interlock with respect to each other and form a beaded driving cable often capable of high pulling strength and flexibility.

Further, the inner cable member of the over-molded beaded cable has a first end portion and a second end portion. The over molded beaded driving cable can also include one or more end fitting members positioned adjacent to at least one end portion to provide an open loop cable. Alternatively, the over-molded driving cable may include the structure and processing which forms the connection for a closed loop cable.

Further objects and advantages of the invention will be apparent from the following description and appended claims, reference being made to the accompanying drawings forming a part of the specification, wherein like reference characters designate corresponding parts in several views.

BRIEF DESCRIPTION OF THE DRAWINGS

FIG. 9 is a cross-sectional view of an over-molded beaded driving cable with a pre-formed inner core in accordance with a further embodiment of the present invention;

FIG. 10 further is a concentric cross-sectional view of an outer bead member and pre-formed inner core configuration in accordance with FIG. 9;

FIG. 11 is a schematic view of an alternative over-molded beaded driving cable in accordance with the present invention; and FIG. 12 is a schematic view of another alternative over-molded beaded driving cable in accordance with another embodiment of the present invention.

DETAILED DESCRIPTION OF THE PREFERRED EMBODIMENT

Figure 1:
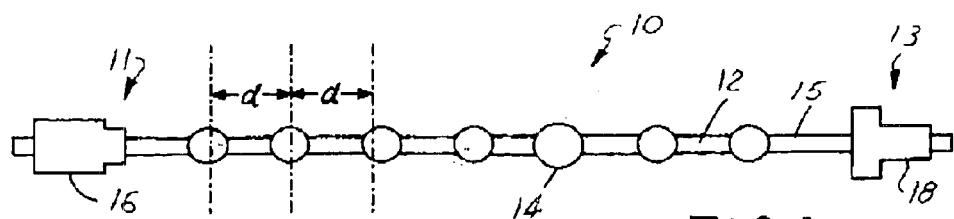
FIG. 1 is an illustration of an open loop driving cable in accordance with a preferred embodiment of the present invention.

Turning to FIG. 1, there is shown, an external view of an open loop over-molded beaded driving cable 10 in accordance with the present invention. In this view, the over-molded beaded cable 10 includes a cable line 12 having an exterior surface 15, a first end portion 11, and a second end portion 13. A plurality of outer bead members 14 are affixed to the exterior surface 15 of the cable line 12. The outer bead members 14 are positioned in a specific pattern between the first end portion 11 and the second end portion 13 of the cable line 12. A first end fitting member 16 is positioned at the first end portion 11 of the open loop over-molded beaded driving cable 10. A second end fitting member 18 is positioned at the second end portion 13 of the over-molded beaded driving cable 10. The end fitting members 16, 18 form sites for the open loop driving cable 10 to connect or attach to other devices. In a typical drive system, the open loop over-molded beaded driving cable 10 is positioned on and extends between two or more devices, permitting the movement of the devices. An automobile lift gate and sliding door are typical automotive applications for this embodiment of the over-molded beaded cable. The driving cable 10 may also be used in non-automotive applications.

Figure 2:
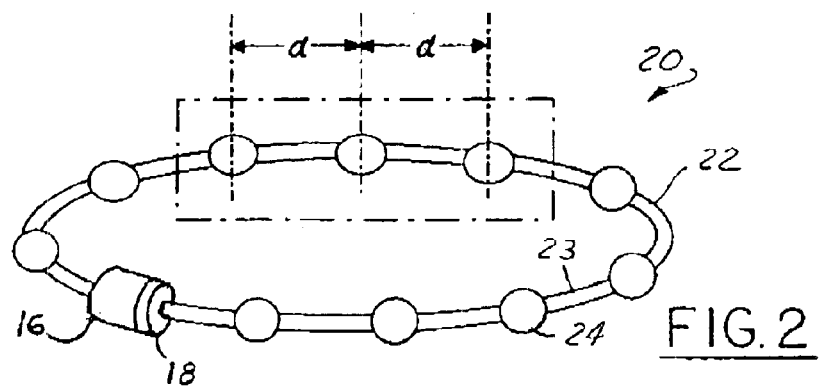
FIG. 2 is an illustration of a closed loop driving cable in accordance with a preferred embodiment of the present invention.

Turning now to FIG. 2, there is shown an external view of another embodiment of the present invention, a closed loop over-molded beaded cable 20. In this embodiment, a cable line 22 has an exterior surface 23 and two end fitting members 16, 18 to form a connection for the closed loop over-molded beaded cable 20. The end fitting members 16, 18 may be comprised of plastics, including polyamides, such as molding nylon 6 and nylon 66, polyester, liquid crystal polymer, acrylonitrile-butadiene-styrene (ABS), polypropylene, polyethylene, polyurethane, polycarbonate and Vectra™. High strength plastics are preferred, such as an ABS polycarbonate blend (ABS/PC), and nylon 6 and nylon 66 each with approximately 10 to 33 weight percent fiberglass component. Alternatively, the end fitting members 16, 18 may be comprised of metal, such as steel, stainless steel, zinc, as zinc die cast, aluminum, copper and various alloys. Often, the metal end fittings may be clamps, in which case zinc and steel are the preferred materials to comprise the clamps.

A plurality of outer bead members 24 are positioned in a specific pattern and affixed to the exterior surface 23 of the cable line 22. The closed loop over-molded cable 20 can be used in a variety of automotive and non-automotive applications, such as when a driving system includes a sprocket or similar device. The exterior surfaces 15, 23 of the cable line 12, 22 of both the open-loop cable 10 and the closed loop cable 20 may be coated with a protective layer, such as lubricant, adhesive or other applicable materials, depending upon the desired application of the driving cable 10, 20.

Figure 3:
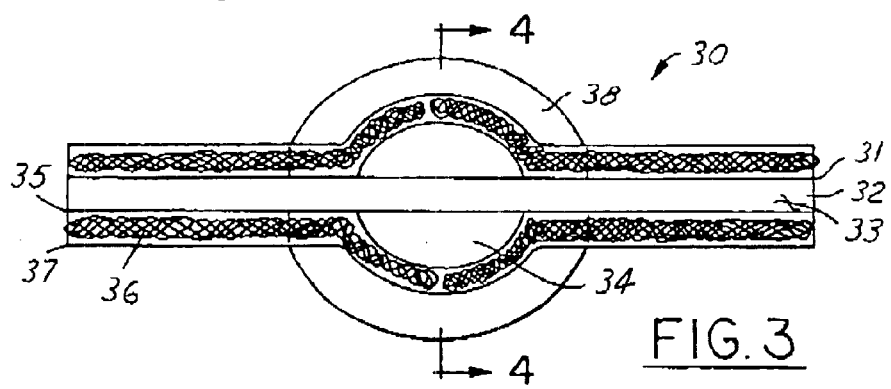
FIG. 3 is a cross-sectional view of an over-molded beaded driving cable in accordance with an embodiment of the present invention.

When viewed collectively, FIGS. 1, 2, and 3 depict the external and internal structure of an over-molded beaded driving cable 10, 20, 30. As shown in FIG. 3, which illustrates a preferred embodiment of the present invention, the driving cable 30 includes an inner cable member 32 with a plurality of inner bead members 34 disposed therearound, as discussed in detail below. The driving cable 30 may also include an outer jacket 36, which may be added by extruding or coating the inner cable member 32 with a non-metallic material, or by braiding yarn, strand or threadline over the inner cable member 32. Further illustrated in FIG. 3, each outer bead member 38 concentrically encases an inner core structure 34. The inner bead members 34 and the outer bead members 38 are placed in a pattern of distance intervals. The exact distance and placement pattern of the beads is determined by the particular application and may obviously vary.

Looking more closely at a preferred embodiment of the present invention, FIG. 3 is a cross-sectional view of an outer bead member 38 and inner core structure 34 configuration of an over-molded beaded driving cable 30. In this preferred embodiment, an inner cable member 32 is comprised of a plurality of fibers 33. High performance polymer fibers are preferred, such as liquid Crystal Polymer Vectran™ fiber, aromatic polyester, aromatic polyamide, and high density and ultra-high molecular weight polyethylene, for high tensile strength and better flexibility. Other synthetic fibers may include compositions of polyamide, including nylon 6, and nylon 66, polyester, polypropylene, liquid crystal polymer and other synthetic materials known to those skilled in the art. In addition, natural fibers such as cotton, wool, silk, and jute in the form of yarn, strand or thread may be used to form the inner cable member 32. Alternatively, metal wires such as galvanized steel, steel and stainless steel cable (7×19, 7×7, for example), and copper may be used. The materials included here are examples and it is understood that a variety of other materials known to those skilled in the art, metallic and non-metallic, may form the fibers 33 of the inner cable member 32.

In a preferred embodiment, as discussed above, the inner cable member 32 is constructed of continuous filament structures which may be braided, twisted or uni-directed. The exact configuration of the inner cable member 32 is determined by the desired application. An exterior surface 31 of the inner cable member 32 may be coated with a layer of lubricant, adhesive or other coating.

Also shown in FIG. 3, the inner cable member 32 has a plurality of inner bead members 34 attached therearound. The shapes of the inner bead members 34 may be determined according to the desired application. These inner bead members 34 may be spherical, rectangular, elliptical, cylindrical, or a variety of other shapes according to the requirements for a desired application. The inner bead members 34 can be comprised of plastics, including polyamides, such as molding nylon 6, and nylon 66, polyester, liquid crystal polymer, polypropylene, polyethylene, polyurethane, polycarbonate and Vectram™. High strength plastics are preferred, such as acrylonitrile-butadiene-styrene (ABS), thermoplastic polyurethane (TPU) and Nylon 6 and Nylon 66 each with approximately 10 to 33 weight percent fiberglass component. In addition, the inner bead members 34 may be formed of composites, metals or materials known to those skilled in the art. The inner bead members 34 may be clamps, preferably comprised of zinc or steel. The inner bead members 34 can be formed by various methods, including injection, pultrusion, clamping or other means which are known to those skilled in the art. The exact composition and formation of the inner bead structures 34 will be determined by the desired application and method of manufacture.

FIG. 3 further depicts an outer jacket 36 surrounding the inner cable member 32 and the inner bead members 34. The outer jacket 36 may be added by extruding or coating the inner cable member 32 with a non-metallic material, or by braiding yarn, strand or threadline over the inner cable member 32. The outer jacket 36 may be comprised of materials similar to the inner cable member 32, namely, metal wires, synthetic fibers, threads, natural fibers and other materials known to those skilled in the art. High performance polymer fibers are preferred, such as Liquid Crystal Polymer Vectran™ fiber, aromatic polyester, aromatic polyamide, and high density and ultra-high molecular weight polyethylene, for high tensile strength and better flexibility. Other synthetic fibers may include compositions of polyamide, including nylon 6, and nylon 66, polyester, polypropylene, liquid crystal polymer and other synthetic materials known to those skilled in the art. In addition, natural fibers such as cotton, wool, silk, and jute in the form of yarn, strand or thread may be used to form the inner cable member 32. Alternatively, metal wires such as galvanized steel, steel and stainless steel cable (7×19, 7×7, for example), and copper may be used.

It is preferred that the wires and fibers of the inner cable member 32 and the outer jacket 36 both be of a continuous filament structure with a diameter from 2.0 to 250.0 microns, although 5.0 to 50.0 microns is further preferred. Alternatively, the outer jacket 36 may be comprised of elastomeric compounds, including but not limited to rubbers and thermoplastic olefins. An interior surface 35 of the outer jacket 36 is in contact with the exterior surface 31 of the inner cable member 32 and surrounds the inner cable member 32 and the inner bead members 34.

An outer bead 38 of larger diameter than the inner core structure 34 is concentrically placed over the inner core structure 34 of the inner cable member 32. The outer bead 38 may be comprised of plastic, such as polyamide, polyester, liquid crystal polymer, polypropylene, polyethylene, acrionitrile-butadiene-stryene (ABS) and polyurethane, or metal, such as steel stainless steel, zinc, such as zinc die cast, aluminum, copper, and alloy. Suitable materials include molding nylon 6, nylon 66, and Vectra™. The preferred composition for the outer beads 38 are high strength and high wear resistance plastics which provide a cable with improved wear resistance and less operational noise. Preferred materials for the outer beads 38 are liquid crystal polymer, Nylon 6 and Nylon 66, each with approximately 10 to 33 weight percent fiberglass component and thermoplastic polyurethane (TPU). Often, a TPU blend is preferred to achieve the desired strength and wear resistance, for example thermoplastic polyurethane and polycarbonate blend (TPU/PC), such as Texin™4210, and TPU/PU 2102™.

The outer bead member 38 is molded or otherwise attached over the outer jacket 36. In this position, the inner core structure 34 and the outer bead 38 interlock and provide a cable with increased strength. An exterior surface 37 of the outer jacket 36 may also be treated further with a lubricant, adhesive or coating material depending upon the desired application.

Figure 4:
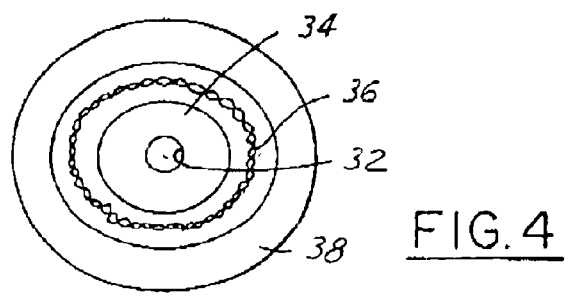
FIG. 4 is a concentric cross-sectional view of an over-molded inner core structure and outer bead member configuration of the present invention as shown in FIG. 3.

FIG. 4 illustrates more closely the concentric positioning of the inner cable member 32, the inner core structure 34, the outer jacket 36 and the outer bead member 38. This concentric configuration provides an over-molded beaded driving cable 30 which often achieves greater strength and flexibility than current driving cables.

Figure 5:
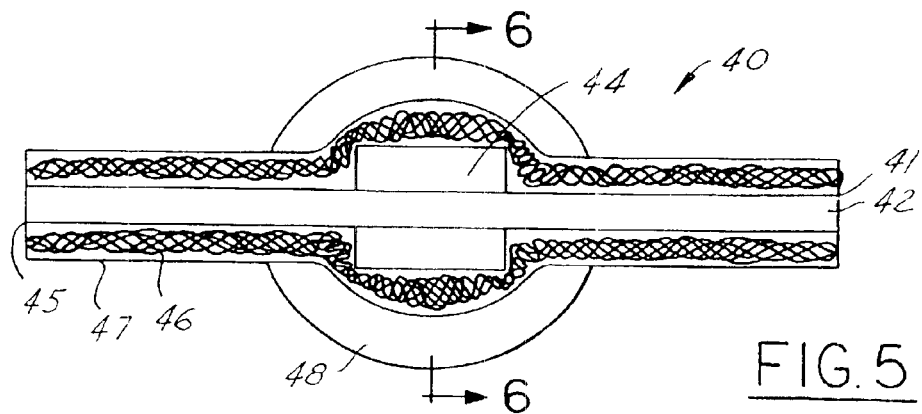
FIG. 5 is a cross-sectional view of an another embodiment of an over-molded beaded driving cable with clamps functioning as inner bead members in accordance with the present invention.

FIG. 5 illustrates an additional embodiment of the over molded beaded driving cable 40. In this embodiment, the driving cable 40 includes an inner cable member 42 with an exterior surface 41 and a plurality of inner bead members that are clamps 44. The inner clamps 44 may be comprised of plastics, resins, composite metals, or other materials known to those skilled in the art and may be pre-clamped to the exterior surface 41 of the inner cable member 42. Inner core clamps 44 comprised of zinc or steel are preferred. The inner clamps 44 may be over-molded or attached to the inner cable member 42 in a manner that meets the desired application and process of making the driving cable 40.

Figure 6:
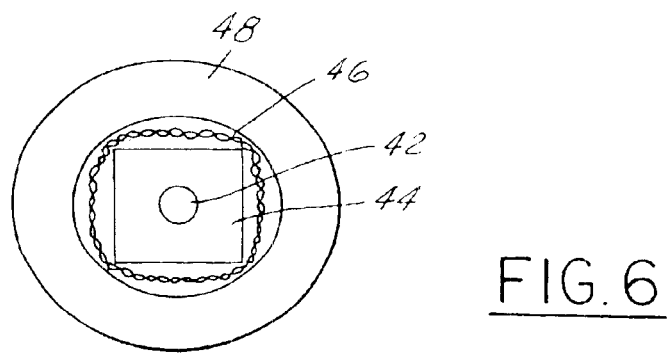
FIG. 6 is a concentric cross-sectional view of the inner clamp and outer bead member configuration shown in FIG. 5.

In this embodiment, as further illustrated in FIG. 5, an outer jacket 46 surrounds the inner cable member 42 including the plurality of inner clamps 44. The interior surface 45 of the outer jacket 46 is in contact with the exterior surface 41 of the inner cable member 42. A plurality of outer beads 48 of a diameter larger than the inner clamps 44 are placed on the exterior surface 47 of the outer jacket 46. The outer beads 48 are positioned concentrically over the inner clamps 44 and subsequently molded onto the outer jacket 46. FIG. 6 is a cross-sectional view of the concentricity of the inner cable member 42, the inner clamp 44, the outer jacket 46 and the outer bead member 48.

Figure 7:
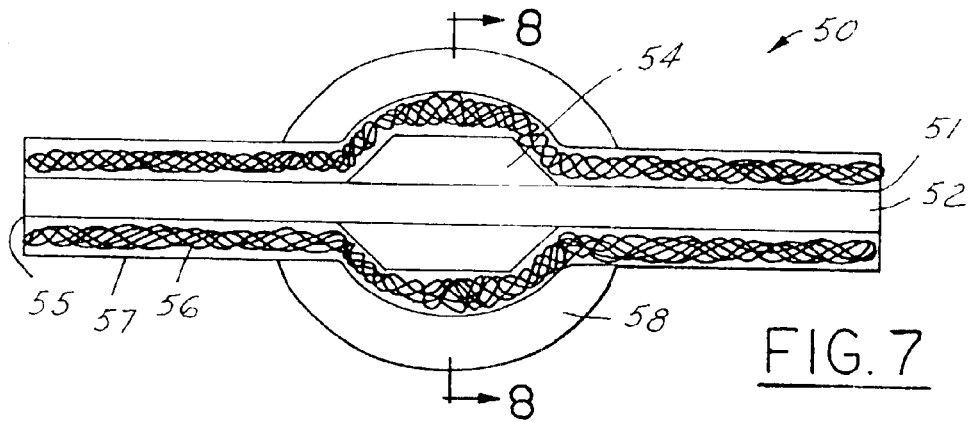
FIG. 7 is a cross-sectional view of another embodiment of an over-molded beaded driving cable comprising a molded inner core with inner bead members in accordance with the present invention.
Figure 8:
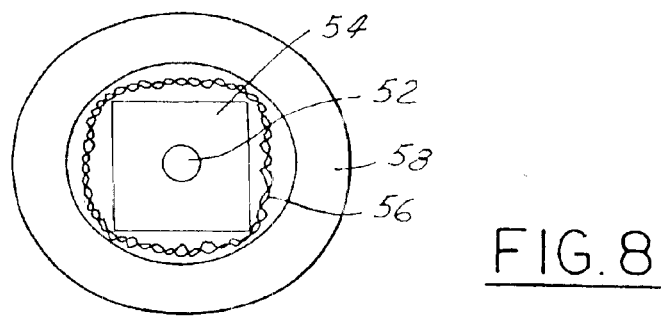
FIG. 8 is a concentric cross-sectional view of an outer bead member and molded inner core with inner core structure configuration shown in FIG. 7 in accordance with the present invention.

An over-molded beaded driving cable 50, viewed in FIG. 7, further comprises a molded inner cable member 52 and a plurality of inner bead members comprised of shaped sections 54 of the molded inner cable member 52. In this configuration, the molded inner cable member 52 is often constructed of interwoven filaments, where upon the inner core filaments are molded to form shaped sections 54. Alternatively, the shaped sections 54 can be constructed of a resin material which is applied to the inner cable member 52. Following the pre-resinating of the inner cable member 52, the resin is molded and shaped into any of a variety of shapes to satisfy the requirements of a desired application. As in other embodiments of the present invention, an outer jacket 56 may surround the pre-resinated or molded inner cable member 52 and shaped sections 54. An interior surface 55 of the outer jacket 56 is in contact with an exterior surface 51 of the molded inner cable member 52 with shaped sections 54. A plurality of outer bead members 58 are placed on the exterior surface 57 of the outer jacket 56 in position concentric to each shaped section 54. FIG. 8 further illustrates the concentric positioning of the molded inner cable member 52, the shaped section 54, the outer jacket 56 and the outer bead members 58.

In a preferred embodiment, as viewed in FIG. 9, an over-molded beaded driving cable 60 with a pre-formed inner cable member 62 is shown. In this embodiment, the pre-formed inner cable member 62 is often constructed of metals, plastics, rubbers, composites, elastomers, or materials known to those skilled in the art. The pre-formed inner cable member 62 includes a plurality of inner bead members which are shaped sections 63 of the pre-formed inner cable member 62. The shaped sections 63 protrude in distinct shapes from the exterior surface 61 of the pre-formed inner cable member 62. An interior surface 65 of an outer jacket 66 may surround the pre-formed inner cable member 62 at the exterior surface 61. As in other embodiments of the present invention, a plurality of outer bead members 68 is placed on the exterior surface 67 of the outer jacket 66. The outer bead members 68 are positioned concentrically around the shaped sections 63 of the pre-formed inner cable member 62.

The over-molded beaded driving cable 60 with a pre-formed inner cable member 62 is a preferred embodiment due to its cost effectiveness and simplicity to produce. FIG. 10 is a cross-sectional view of the concentric arrangement of the pre-formed inner core 62, the shaped section 63, the outer jacket 66 and an outer bead member 68.

FIGS. 11 and 12 further depict two additional construction options of the over-molded beaded driving cable 70, 80, each having an inner cable member 72, 82, a plurality of inner bead members 71, 81, an outer jacket 76, 86 and an outer bead member 78, 88. As depicted in FIG. 11 and FIG. 12, a shape of an inner core structure may be selected from a variety of dimensions and shapes, depending upon the desired application. However, as FIGS. 11 and 12 further illustrate, an external view of the over-molded beaded cable 70, 80 does not indicate the shape, design or configuration of the inner cable member 72, 82 and inner bead members 71, 81. The over-molded beaded driving cables 70, 80 have similar external dimensions and appearance, yet have dissimilar internal configurations, and may provide distinct and varied applications for each cable 70, 80.

In accordance with the present invention, an over-molded beaded driving cable comprises an inner cable member having a plurality of inner bead members, an outer jacket which may surround the inner cable member and inner bead members, and a plurality of outer bead members.

The inner cable member may be formed in a variety of configurations. A fiber or wire based inner cable member may be a comprised of continuous filament fibers that can be uni-directed, twisted, or braided yarn, strand or threadline. The fashion in which the fibers are interwoven increases the over-all strength of the over-molded beaded driving cable. Preferably, a braided inner cable member often provides the strength and flexibility for use in high load application, such as garage doors, and power sliding doors, as well as other automotive and non-automotive applications. Generally, an inner cable member constructed of uni-directed fibers may be less expensive to produce than the braided inner cable member. A uni-directed inner cable member may be applicable for applications such as window systems. An over-molded beaded driving cable with a twisted inner core may exhibit a variety of applications depending upon the twist direction, angle and frequency. An inner core constructed with high twist angle and frequency is more solid and less flexible than an inner cable member with lower twist angle and frequency. Although the twisted inner cable member can be complex to construct, the twisted inner cable member may offer a wide range of applications.

Materials for the inner cable member, and the outer jacket as well, may be metal wires, synthetic fibers, threads, natural fibers and a variety of other weavable materials. The diameter of the fiber can be within the range of 2.0 to 250.0 microns, with a preferred range of 5.0 to 50.0 microns.

A preferred embodiment of the over-molded beaded driving cable includes a pre-formed inner cable member. In this construction, the inner cable member with the inner bead members is formed as a one unit. The inner bead members are shaped sections which protrude from the surface of the inner cable member.

The pre-formed inner cable member and molded inner cable member may be comprised of metals, plastics, composites, elastomers, such as rubbers and thermoplastic olefin, and other suitable materials, including Vectra™. The pre-formed inner cable member can be formed by extrusion, injection, pultrusion, or other means which are known to those skilled in the art.

The inner bead members 34 may be structured separately and attached to the inner cable member, such as beads or clamps, or shaped sections of a pre-resinated or molded cable member or shaped sections of a pre-formed cable member. Separate inner bead members, such as beads or clamps, may be comprised of a wide variety of plastics or metals. The separate inner bead members may be over molded, crimped or die casted onto the inner cable member. The method of attachment will vary with the desired application and construction process.

Altenatively, the inner bead members may be shaped sections that are integrally formed with the inner cable member, as a molded inner cable member or a pre-formed inner cable member. The shaped sections of the molded cable member may be formed from the inner core materials or a resin material that is applied to the exterior surface of the inner cable member. A shaped section may be a bump or protrusion.

In a preferred embodiment, the inner cable member is pre-formed with protrusions that function as inner bead members. In this embodiment, the inner bead members are an integral component of the inner cable member. Therefore, no additional production or attachment process is required to include the inner bead members in a driving cable assembly.

The shapes of the inner structures, beads, clamps, and shaped sections will vary with the requirements of the desired application. For instance, the inner bead members and the outer bead members may be spherical, rectangular, elliptical, cylindrical, and a variety of other shapes according to the requirements for a desired application.

The outer jacket of the over-molded beaded driving cable may be added by extrusion or coating the inner cable member with a layer of non-metallic material, or braiding yarn, strand or threadline over the inner cable member and inner bead members. The material composition and method of applying the outer jacket will be determined by the desired use, and will be known to those skilled in the art. Both the inner cable member and the outer jacket may be treated with a lubricant, adhesive or suitable material. The material ratio by weight of the inner cable member to outer jacket can be from 10/90 to 90/10. The ratio of 30/70 to 70/30 is preferred.

An outer bead member is concentrically positioned with respect to an inner core structure to provide increased high pulling strength for the beads and the over-molded beaded driving cable. The inner bead members and outer bead members interlock and provide a beaded driving cable which often can be used in high load applications.

The materials for the inner cable member, inner bead members, outer jacket and outer bead members can be selected for optimizing the fuctionality as well as the capability of reducing noise and vibration. A fiber braided inner cable member will provide high strength, high flexibility and lower weight, while performing more quietly and with less vibrations than the prior beaded cable with a metal core.

While the invention has been described in terms of preferred embodiments, it will be understood, of course, that the invention is not limited to thereto, since modifications may be made by those skilled in the art, particularly in light of forgoing teachings.

What is claimed is:

1. A driving cable comprising:
    an inner cable member having a plurality of interwoven fibers;
    a plurality of inner bead members protruding from an exterior surface of said inner cable member; and
    a plurality of outer bead members, each of said plurality of outer bead members being sized larger than each of said plurality of said inner bead members, each of said plurality of outer bead members surrounding a respective one of said plurality of inner bead members.

2. The driving cable of claim 1 wherein said plurality of interwoven fibers is comprised of a plurality of high performance polymer fibers.

3. The driving cable of claim 2 wherein said plurality of high performance polymer fibers is comprised of a liquid crystal polymer formulation.

4. The driving cable of claim 1 further comprising an outer jacket surrounding said inner cable member and said plurality of inner bead members.

5. The driving cable of claim 4 wherein said outer jacket is positioned between said plurality of inner bead members and said plurality of outer bead members.

6. The driving cable of claim 4 wherein said outer jacket is comprised of high density ultra-high molecular weight polyethylene fibers.

7. The driving cable of claim 4 wherein the material ratio by weight of said inner cable member to said outer jacket is from 10:90 to 90:10.

8. The driving cable of claim 7 wherein the material ratio is from 30:70 to 70:30.

9. The driving cable of claim 1 further comprising a first and second end portion of said inner cable member and a pair of end fitting members, one of said end fitting members being positioned at said first end portion of the inner core member, and the other of said pair of end fitting members being positioned at said second end portion of said inner core member, and wherein said driving cable is a closed loop driving cable and said pair of end fitting members comprises a connection for said closed loop driving cable.

10. The driving cable of claim 9 wherein said pair of end fitting members is comprised of a composition of a polyamide and approximately 10 to 33 weight percent fiberglass.

11. The driving cable of claim 1 wherein each of said plurality of outer bead members has a shape selected from the group consisting of an ellipsoid, a rectangular parallelpiped, and a cylinder.

12. The driving cable of claim 1 wherein said plurality of inner bead members is comprised of a plurality of interwoven fibers, a resin and/or a plastic material selected from the group consisting of a polyamide, a polyester, a liquid crystal polymer, a polypropylene, a polyethylene, a polyurethane, and a polycarbonate.

13. The driving cable of claim 1 wherein said plurality of interwoven fibers have a configuration selected from the group consisting of a braided configuration and a twisted configuration.

14. The driving cable of claim 1 wherein said plurality of interwoven fibers is comprised of a plurality of continuous filaments.

15. A driving cable assembly comprising:
    an inner cable member having a first and a second end portion;
    a plurality of inner bead members protruding from an exterior surface of said inner cable member;
    a plurality of outer bead members surrounding said plurality of inner bead members, each of said outer bead members being concentrically positioned around a respective one of said plurality of inner bead members and positioned on said inner cable member to form an interlocking bead system; and
    at least one end fitting member being positioned at either said first or second end portions of said inner cable member;
    wherein said inner cable member and said plurality of inner bead members comprise a one-piece beaded cable member, said one-piece beaded cable member being comprised of a high-tensile strength and flexible non-metal material.

16. The driving cable assembly of claim 15 further comprising:
    an outer jacket surrounding said inner cable member and said plurality of inner bead members.

17. The driving cable of claim 15 wherein said one-piece beaded cable member is comprised of a plurality of interwoven fibers, a resin and/or a plastic material selected from the group consisting of a polyamide, a liquid crystal polymer, a polypropylene, a polyethylene, a polyurethane, and a polycarbonate.

18. The driving cable of claim 17 wherein said plurality of interwoven fibers have a configuration selected from the group consisting of a braided configuration and a twisted configuration.

19. The driving cable of claim 17 wherein said plurality of interwoven fibers is comprised of a plurality of continuous filaments.

20. The driving cable of claim 19 wherein the material ratio by weight of said inner core member to said outer jacket is from 10:90 to 90:10.

21. The driving cable of claim 20 wherein the material ratio is from 30:70 to 70:30.

* * * * *